United States Patent
Chellapilla et al.

(10) Patent No.: US 7,792,877 B2
(45) Date of Patent: Sep. 7, 2010

(54) SCALABLE MINIMAL PERFECT HASHING

(75) Inventors: Kumar H. Chellapilla, Redmond, WA (US); Anton Mityagin, Woodenville, WA (US); Denis Xavier Charles, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 11/799,370

(22) Filed: May 1, 2007

(65) Prior Publication Data
US 2008/0275847 A1 Nov. 6, 2008

(51) Int. Cl.
G06F 7/00 (2006.01)
G06F 17/00 (2006.01)
(52) U.S. Cl. .................. 707/803; 707/953
(58) Field of Classification Search ............ 707/1–10, 707/100–104.1, 200–26, 600–831
See application file for complete search history.

(56) References Cited

U.S. PATENT DOCUMENTS

| | | | |
|---|---|---|---|
| 5,051,745 A | 9/1991 | Katz | |
| 5,406,279 A | 4/1995 | Anderson et al. | |
| 5,692,177 A | 11/1997 | Miller | |
| 5,701,418 A | 12/1997 | Luitje | |
| 6,014,733 A | 1/2000 | Bennett | |
| 6,167,392 A | 12/2000 | Ostrovsky et al. | |
| 6,292,880 B1 | 9/2001 | Mattis et al. | |
| 7,031,985 B1 | 4/2006 | Pecheny | |
| 7,171,439 B2 | 1/2007 | Honig | |
| 2006/0248079 A1 | 11/2006 | Braica | |
| 2007/0244850 A1* | 10/2007 | Hoppe et al. | 707/2 |

FOREIGN PATENT DOCUMENTS

WO   WO03081461 A1   10/2003

OTHER PUBLICATIONS

Martinez et al., Adaptive Hashing for IP Address Lookup in Computer Networks, Sep. 2006, vol. 1, 1-6.*
Brain et al., Using tries to eliminate pattern collisions in perfect hashing, Apr. 1994, vol. 6, 239-247.*
Trono John A., "An Undergraduate Project to Compute Minimal Perfect Hashing Functions", Date: 1992, vol. 24, Issue: 3, pp. 53-56, http://delivery.acm.org/10.1145/150000/142077/p53-trono.pdf?key1=142077&key2=4986816711&coll=GUIDE&dl=GUIDE&CFID=16105117&CFTOKEN=67755489.
"Software Optimization Guide for AMD64 Processors", Date: 2005, pp. 180-181, http://www.amd.com/us-en/assets/content_type/white_papers_and_tech_docs/25112.PDF.

(Continued)

Primary Examiner—Jean B Fleurantin

(57) ABSTRACT

A minimal perfect hash function can be created for input data by dividing the input data into multiple collections, with each collection comprising fewer elements that the input data as a whole. Subsequently, minimal perfect hash functions can be created for each of the collections and the resulting hash values can be offset by a value equivalent to the number of input data in preceding collections. The minimal perfect hash function can, thereby, be derived in parallel and can consume substantially less storage space. To further save storage space, the internal state of each individual minimal perfect hash function can be further compressed using algorithms exploiting a skewed distribution of values in a lookup table comprising the internal state.

18 Claims, 8 Drawing Sheets

OTHER PUBLICATIONS

Brin, et al., "The Anatomy of a Large-Scale Hypertextual Web Search Engine", Date: 1998, vol. 30, Issue: 1-7, pp. 107-117, http://www.citeulike.org/user/rabourn/article/922.

Bharata, et al., "The Connectivity Server: Fast Access to Linkage Information on the Web", Date: Apr. 1998, pp. 469-477, http://cat.inist.fr/? aModele=afficheN&cpsidt=2306496.

Botelho, et al., "A Practical Minimal Perfect Hashing Method", Date: 2005, vol. 3505, pp. 488-500, http://homepages.dcc.ufmg.br/~nivio/papers/wea05.pdf.

Carriere, et al., "WebQuery: Searching and Visualizing the Web through Connectivity", Date: 1997, pp. 701-711, http://www.cgl.uwaterloo.ca/Projects/Vanish/webquery-1.html.

Cichelli J. R., "Minimal Perfect Hash Functions Made Simple", Date: 1980, vol. 23, Issue: 1, pp. 17-19, http://delivery.acm.org/10.1145/360000/358813/p17-cichelli.pdf?key1=358813&key2=4207966711&coll=GUIDE&dl=GUIDE&CFID=16555033&CFTOKEN=59855887.

Cercone, et al., "Minimal and Almost Minimal Perfect Hash Function Search with Application to Natural Language Lexicon Design", Date: 1983, vol. 9, Issue: 1, pp. 215-231, http://md1.csa.com/partners/viewrecord.php?requester=gs&collection=TRD&recid=0537102CI&q=Minimal+and+almost+minimal+perfect+hash+function+search+with+application+to+natural+language+lexicon+design&uid=790359151&setcookie=yes.

Cercone, et al., "An Interactive System for Finding Perfect Hash Functions", Date: 1985, vol. 2, Issue: 6, pp. 38-53, http://ieeexplore.ieee.org/xpl/freeabs_all.jsp?isnumber=35721&arnumber=1695429&count=11&index=2.

Czech, et al., "An Optimal Algorithm for Generating Minimal Perfect Hash Functions", Date: 1992, vol. 43, Issue: 5, pp. 257-264, http://citeseer.ist.psu.edu/122364.html.

Flake, et al., "Efficient Identification of Web Communities", Date: Aug. 20-23, 2000, pp. 150-160, http://delivery.acm.org/10.1145/350000/347121/p150-flake.pdf?key1=347121&key2=6295536711&coll=GUIDE&dl=GUIDE&CFID=19734448&CFTOKEN=34943566.

Fox, et al., "A More Cost-Effective Algorithm for Finding Perfect Hash Functions", Date: Feb. 1989, pp. 114-122, http://delivery.acm.org/10.1145/80000/75440/p114-fox.pdf?key1=75440&key2=5675966711&coll=GUIDE&dl=GUIDE&CFID=20051196&CFTOKEN=45212565.

Fox, et al., "A Faster Algorithm for Constructing Minimal Perfect Hash Functions", Date: 1992, pp. 266-273, http://delivery.acm.org/10.1145/140000/133209/p266-fox.pdf?key1=133209&key2=6256966711&coll=GUIDE&dl=GUIDE&CFID=16554644&CFTOKEN=18001236.

Fox, et al., "Practical Minimal Perfect Hash Functions for Large Databases", Date: 1992, vol. 35, Issue: 1, pp. 105-121, http://delivery.acm.org/10.1145/130000/129623/p105-fox.pdf?key1=129623&key2=2766966711&coll=GUIDE&dl=GUIDE&CFID=20052014&CFTOKEN=93793912.

Fredman, et al., "Storing a Sparse Table with O(1) Worst-Case Access Time", Date: 1984, vol. 31, Issue: 3, pp. 538-544, http://delivery.acm.org/10.1145/10000/1884/p538-fredman.pdf?key1=1884&key2=9442076711&coll=GUIDE&dl=GUIDE&CFID=16559360&CFTOKEN=42070146.

Gyöngyi, et al., "Combating Web Spam with TrustRank", Date: 2004, pp. 576-587, http://www.nblavoie.com/documentsPDF/trustrank.pdf.

Kleinberg J. M., "Authoritative Sources in a Hyperlinked Environment", Date: 1999, vol. 46, Issue: 5, pp. 604-632, http://delivery.acm.org/10.1145/330000/324140/p604-kleinberg.pdf?key1=324140&key2=0265536711&coll=GUIDE&dl=GUIDE&CFID=16277172&CFTOKEN=23475265.

Majewski, et al., "A Family of Perfect Hashing Methods", Date: 1996, vol. 39, Issue: 6, pp. 547-554, http://comjnl.oxfordjournals.org/cgi/content/abstract/39/6/547.

Sprugnoli R., "Perfect Hashing Functions: A Single Probe Retrieving Method for Static Sets", Date: 1977, vol. 20, Issue: 11, pp. 841-850, http://delivery.acm.org/10.1145/360000/359887/p841-sprugnoli.pdf?key1=359887&key2=1686966711&coll=GUIDE&dl=GUIDE&CFID=20052141&CFTOKEN=24875089.

Sager T.J., "A Polynomial Time Generator for Minimal Perfect Hash Functions", Date: 1985, vol. 28, Issue: 5, pp. 523-532, http://delivery.acm.org/10.1145/10000/3538/p523-sager.pdf?key1=3538&key2=6792076711&coll=GUIDE&dl=GUIDE&CFID=16559746&CFTOKEN=63935224.

Toyoda, et al., "Creating a Web Community Chart for Navigating Related Communities", Date: 2001, pp. 103-112, http://delivery.acm.org/10.1145/510000/504244/p103-toyoda.pdf?key1=504244&key2=1216536711&coll=GUIDE&dl=GUIDE&CFID=16277532&CFTOKEN=43381694.

International Search Report from related PCT Application No. PCT/US2008/062035 dated Dec. 23, 2008, all Pages.

* cited by examiner

SCALABLE MINIMAL PERFECT HASHING

BACKGROUND

The core of the World Wide Web (WWW) comprises several billion interlinked web pages. Accessing information on almost any of these web pages would be essentially impossible without the aid of systems that enable a user to search for specific text, or textual identifiers. Indeed, such systems, generally known as "search engines," have increased in popularity as the WWW has grown in size.

However, to provide reasonable response times, search engines cannot search billions of web pages by accessing each page every time a user searched for a term. Instead search engines typically rely on locally stored information that represents the relevant data, such as the text, from each web page. Thus, to identify one or more web pages that are responsive to a user's search query, a search engine need only access information local to the search engine.

Unfortunately, when dealing with billions of individual web pages, storing even a few kilobytes of data per page can require a total storage capacity of several terabytes. For example, a web page can be uniquely identified by its Uniform Resource Locator (URL). Thus, when storing relevant information about a web page, a search engine can identify the web page from which such information was obtained by its URL. Because a search engine may collect information from a single web page in multiple databases or data structures, it may need to reference that information using the web page's URL multiple times. A typical URL, expressed as plain text, can be a hundred bytes or more. Thus, for billions of web pages, the mere use of the URL to identify information obtained from the web page can, by itself, require several terabytes of storage capacity. Consequently, instead of using a text-based URL to identify a web page, search engines more commonly use a hash of the URL to identify a web page for purposes of storing information into their local search databases. Mathematically, at least 35 bits are required to uniquely identify between 16 and 32 billion web pages, and many search engines uses hashes that result in hash values that can be as large as 80 bits, or ten bytes. Nevertheless, even a ten byte identifier for a web page can save terabytes of storage capacity when compared with a hundred byte textual URL.

The problem of storing a large quantity of uniquely identifiable information is not unique to WWW search engines. For example, modern operating systems include an analog of a WWW search engine for providing users with an efficient interface to the users' ever increasing collection of digital data. If each file is identified by its file path within the file system, and its name, such information alone can require a hundred bytes, or more. If a hundred thousand of the user's files are cataloged, the identification information alone can require several megabytes. Similarly, a large database comprising information associated with millions of individual entries can require several megabytes merely for the storage of identification information for those entries. In such cases, hashing often provided a mechanism by which the identifying information could be transformed into a value that required less storage space. Unfortunately, the hashing mechanisms themselves often consumed a large amount of storage space, offsetting some of the storage efficiency gains realized by using hashes in place of less space-efficient information.

SUMMARY

To enable information, especially large quantities of unique information, such as unique identifiers, to be hashed and represented as a smaller value; while simultaneously saving storage space, the hashing can be divided by collections of information, and an offset can be maintained for each collection. More specifically, a minimal perfect hash function can be used, providing for resulting hash values that are always different for different input data and that have no gap, or are otherwise missing hash values between the minimum and maximum hash value. Thus, two groups of items can be hashed using a minimal perfect hash function, and the resulting hash values can form a contiguous collection of values when the resulting hash values from one group are offset by a value equal to the number of items in the other group. Each group, however, being smaller than the combination of groups, can be hashed such that the resulting hash values do not require as many bits as would have been required if all of the items from the combination of groups were hashed. Additionally, because minimal perfect hash functions output a contiguous range of hash values, those hash values can act as pointers into an array of the original data, enabling the storage of such data in an optimal manner.

The generation of a minimal perfect hash function can be a computationally expensive operation, especially for a large number of individual items. By using groupings comprising a smaller number of items, and an offset, to hash a large number of individual items, the generation of a minimal perfect function for such a large number of individual items can be reduced to the generation of multiple minimal perfect hash functions; one for each of the groupings of items. The generation of such minimal perfect hash functions for each of the groupings of items can be performed in parallel by multiple computing devices or processes, since the generation of a minimal perfect hash function for one group of items is mathematically independent of the generation of a minimal perfect hash function for a different group of items. The multiple minimal perfect hash functions can be rejoined together by specifying an appropriate offset for each minimal perfect hash function representing the cumulative number of items in preceding groupings.

The storage space required can be further reduced by compressing the internal state of one or more of the minimal perfect hash functions. In one embodiment, such compression can be based on the disproportionate number of entries in the internal state of the minimal perfect hash function that are zero. Specifically, rather than expressing such a zero value using the requisite number of bits, a bit vector can be constructed whereby a single bit can represent either the presence of a zero value, or the presence of a value other than zero. The zero values can, subsequently, be deleted, saving storage space. In another embodiment, such compression can be based on the disproportionate number of entries in the internal state of the minimal perfect hash function that have small number values. One compression scheme, contemplated by an embodiment, that can take advantage of such a skewing of the values of the entries, is known as Huffman encoding. The use of a compression scheme, such as Huffman encoding, enables a compressed version of the internal state of the minimal perfect hash function to be stored, thereby reducing storage space requirements. Subsequently, when data is to be hashed using the minimal perfect hash function, the internal state of the minimal perfect hash function can be decompressed prior to use.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
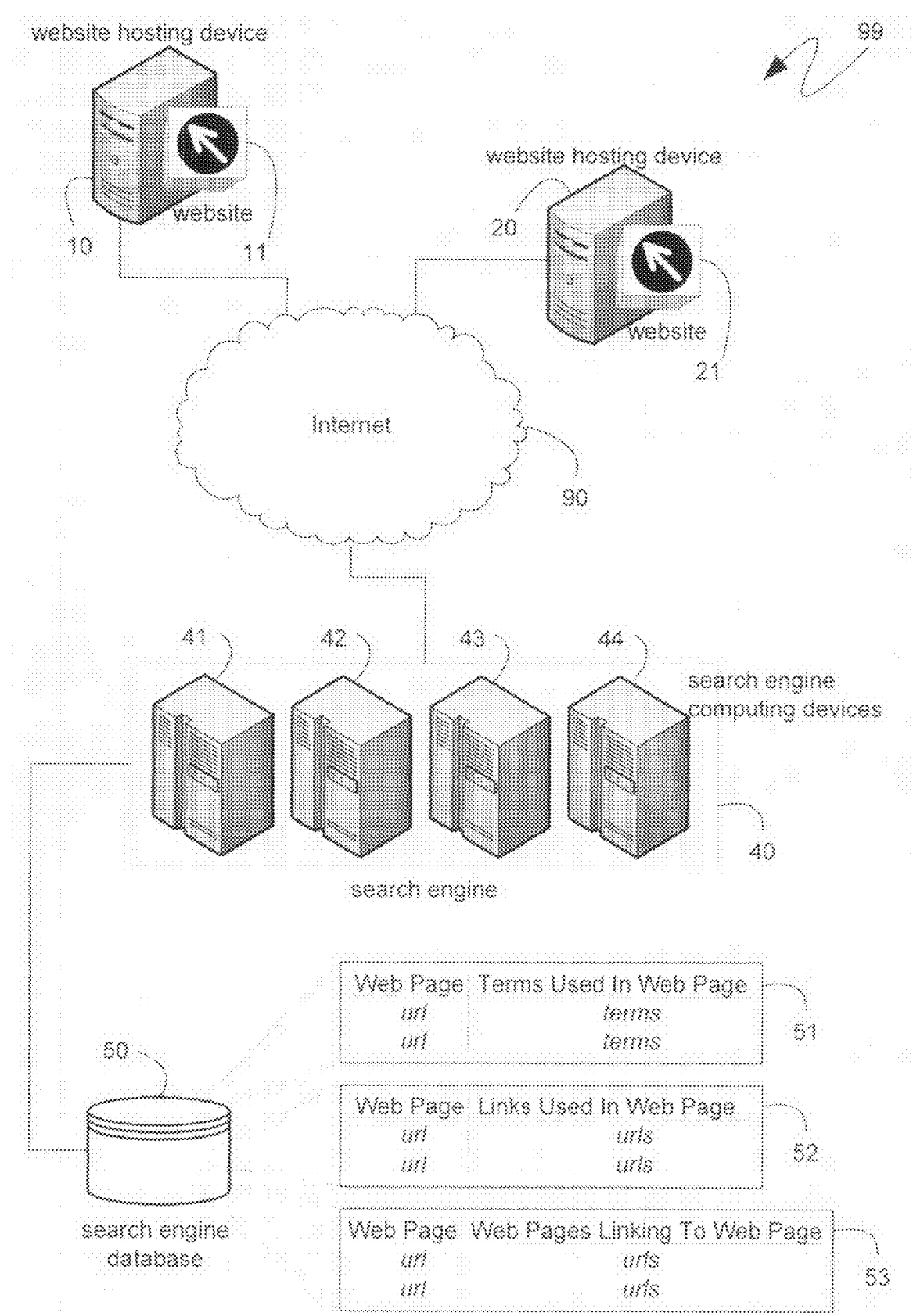
FIG. 1 is a diagram of an exemplary system that provides context for the described functionality.

The following description relates to hashing mechanisms that provide for the hashing of information within a minimum of storage space. In one embodiment, the hashing can be divided by collections of information, and an offset can be maintained for each collection. Thus, to hash a particular element of information, an appropriate collection can initially be identified and the element can then be hashed in accordance with a hash function associated with the identified collection. Subsequently, the resulting hash value can be increased by an offset value associated with the identified collection. In another embodiment, the derivation of hash functions for each of the collections of information can be distributed among multiple computing devices or processes, thereby achieving a performance increase through the parallel computation of such hashing functions. In a further embodiment, the internal state of a hash function, and specifically a minimal perfect hash function, can be compressed to conserve further storage space. One such compression mechanism can comprise the Huffman encoding of the internal state of the hash function. Another such compression mechanism can append a bit vector to the internal state of the hash function, indicating zero value entries via a single bit in the bit vector and, correspondingly, deleting them from the internal state of the hash function.

The techniques described herein focus on the implementation of the above embodiments in the context of the Uniform Resource Locators (URLs) for World Wide Web pages. However, there is nothing unique about URLs that the described embodiments rely on or otherwise use. Consequently, the descriptions below are equally applicable to any kind of data and are not intended to be limited to URLs, other Internet-specific identifiers, or other file identifiers.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 99 is illustrated, providing context for the descriptions below. The exemplary system 99 can be part of the Internet 90, as illustrated, though the reference to the Internet is strictly an example and is not intended to limit the descriptions to Internet protocols, such as the Transmission Control Protocol (TCP), the Internet Protocol (IP), or any other Internet-specific technology. Exemplary system 99 includes website hosting computing devices 10 and 20 connected to the Internet 90. Each of the website hosting devices 10 and 20 hosts a website 11 and 21, respectively, comprising one or more web pages. As will be known by those skilled in the art, the collection of websites hosted by computing devices connected to the Internet 90 is commonly referred to as the World Wide Web. However, as with the reference to the Internet itself, the reference to the World Wide Web is strictly exemplary and is not intended to limit the descriptions to HTTP, HTML, or any other World Wide Web-specific technology.

Also illustrated in FIG. 1 is a search engine 40 comprising one or more search engine computing devices, such as the search engine computing devices 41, 42, 43 and 44. The search engine 40 can respond to user queries for web pages, such as the web pages that comprise websites 11 and 21, by referencing information stored in the search engine database 50. The scope and content of the search engine database 50 can vary significantly depending on the particular implementation of the search engine 40. Strictly for exemplary purposes, the search engine database 50 is shown in FIG. 1 as comprising multiple databases, illustrated as tables, including a database 51 comprising the terms or phrases used in various web pages, a database 52 comprising the links provided in those web pages, and a database 53 comprising the pages which link to those web pages. As can be seen, each of the databases 51, 52 and 53 uses one or more URLs of web pages to identify, either the source web page, or, in the case of links from one web page to another, both the source and destination of those links. The presence of multiple instances of URLs within the search engine database 50 can create an opportunity for significant storage space savings if the URL identifiers within the search engine database 50 can be replaced with smaller identifiers.

Figure 2:
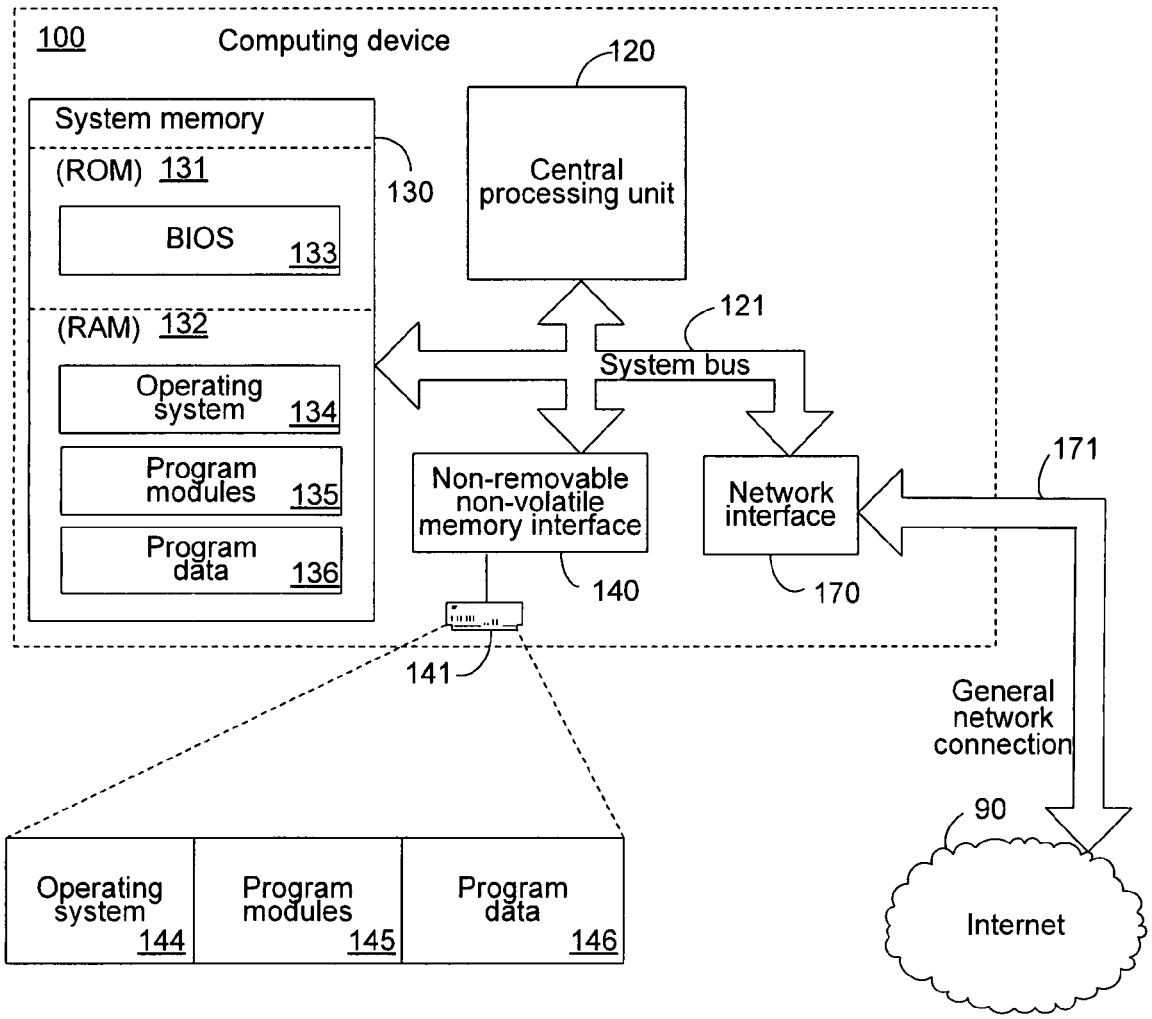
FIG. 2 is a block diagram of an exemplary computing device.

Mechanisms that can be used to replace the URL identifiers, among other things, with smaller identifiers will be described below within the context of computer-executable instructions executing on one or more computing devices. To that extent, FIG. 2 illustrates an exemplary computing device 100, which can be any of the computing devices of system 99 shown in FIG. 1, including the website hosting devices 10 and 20, and any or all of the computing devices that comprise the search engine 40, such as computing devices 41, 42, 43 and 44.

The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include the Peripheral Component Interconnect (PCI) bus and various higher speed versions thereof, the Industry Standard Architecture (ISA) bus and Enhanced ISA (EISA) bus, the Micro Channel Architecture (MCA) bus, and the Video Electronics Standards Associate (VESA) bus. The computing device 100 can optionally include graphics hardware, including, but not limited to, a graphics hardware interface 190 and a display device 191.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For simplicity of illustration, and in conformance with the exemplary system 99 of FIG. 1, the computing device 100 is shown in FIG. 2 to be connected to the Internet 90. However, the computing device 100 is not limited to any particular network or networking protocols. The logical connection depicted in FIG. 2 is a general network connection 171 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 3:
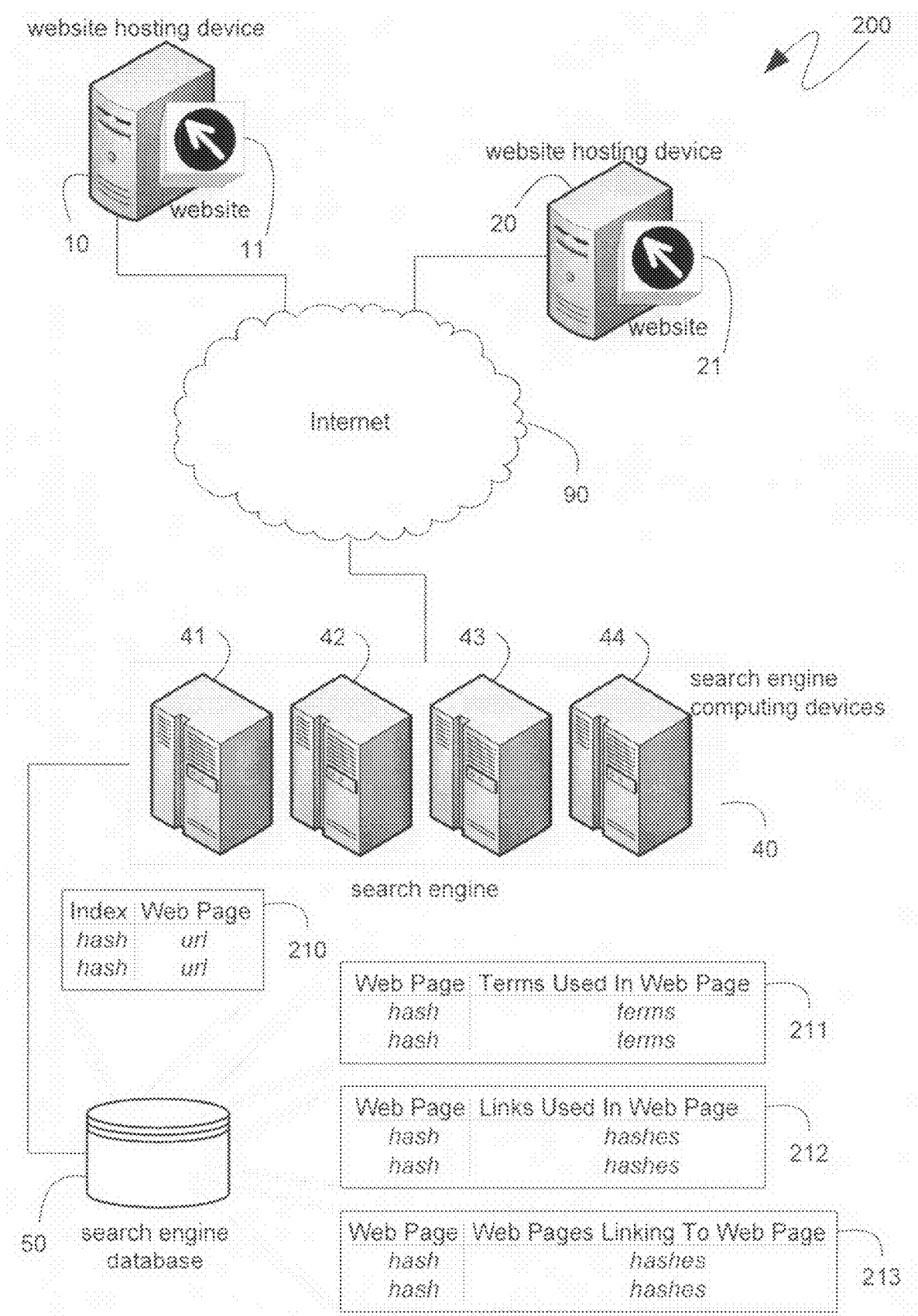
FIG. 3 is a diagram of another exemplary system that provides context for the described functionality.

In one embodiment, the above aspects of a computing device, such as one of the search engine computing devices 41, 42, 43 or 44, can be used to reduce the storage space requirements of the individual databases of the search engine database 50, such as databases 51, 52 and 53, by replacing the URLs contained in those databases with hashes of a minimal size. As shown in the exemplary system 200 of FIG. 3, the individual databases of the search engine database 50 can be transformed such that, rather than using a complete URL to identify a web page and data obtained from that web page, the individual databases can use hashes, where each hash is uniquely associated with a particular URL but consumes only a small fraction of the storage space. Thus, for example, the exemplary databases 51, 52 and 53 of FIG. 1 can be transformed into exemplary databases 211, 212 and 213, respectively, of FIG. 3.

Since the search engine 40 provides one or more URLs in response to a search query, the search engine 40 may ultimately need to translate back from a hash value to a URL in order to provide such information. To facilitate such a translation, the search engine database 50 can, in the embodiment illustrated in FIG. 3, further include a database 210 correlating a hash value to the corresponding URL.

As will be known by those skilled in the art, a hash function applies one or more operations to input data to derive a hash value based on the input data. In theory, each unique input data should result in a unique value. On occasion, however, two or more disparate input data result in the same hash value. Such an occurrence is known as a "collision." A hash function can be designed in which there are no collisions for a given set of input data. Such a hash function is known as a "perfect hash function" for the particular set of input data for which it was designed. The resulting hash values, even from a perfect hash function, can still comprise gaps. Put differently, there may exist hash values that are not obtained for any input data. A perfect hash function that produces hash values that are continuous and begin with a hash value of zero is known as a "minimal perfect hash function."

For example, given four items, a perfect hash function could produce the following hash values (in binary) for the four items: 0101, 0111, 1010, 1110. As can be seen, none of the four items results in a hash value equivalent to the hash value of any other item. However, as can also be seen, the resulting hash values are not contiguous. For example, there is no input data that will result in a hash value of 0110, which is the value between 0101 and 0111. Thus, while the hash function may be perfect, it is not minimal and wastes space by using four bit hash values for only four items. A minimal perfect hash function, on the other hand, given the same four items, could provide the following hash values (again, in binary): 00, 01, 10, 11. Each item still maintains a unique hash value. However, with a minimal perfect hash function, the hash values are contiguous and begin at zero. Consequently, a minimal perfect hash function can provide hash values having fewer bits and, consequently, requiring less storage space.

Mathematically, to provide unique hash values for several billion items, such as several billion URLs, each hash value can be on the order of 32 bits, or four bytes. Many web search engines use 40 bit hashes, or even larger, thereby requiring five bytes of storage space for each hash value. The URLs that such hash values replace, however, can be 100 bytes, or longer. Consequently, by using hashes instead of URLs, the search engine database 50 can be several orders of magnitude smaller.

The storage efficiency gained from using hashes instead of URLs, or any other input data, is offset by the size of the hashing function itself. As will be known to those skilled in the art, minimal perfect hash functions comprise at least one step in which a value is obtained from a lookup table. This lookup table is more often referred to by those skilled in the art as the "internal state" of the hash function, since changes to the values of the lookup table directly impact the resulting hash values and, thus, the hashing function itself.

The lookup table, or internal state, of a minimal perfect hash function can comprise as many unique elements as there are input data, and, as will be known by those skilled in the art, the set of input data for which a minimal perfect hash function is to be derived can be known in advance. Thus, a minimal perfect hash function for hashing, for example, several billion URLs can comprise a lookup table with several billion unique elements. As indicated previously, to uniquely identify several billion elements, approximately 32 bits, or four bytes, are required. Consequently, a lookup table with several billion unique elements, each comprising four bytes, can require 20 to 30 gigabytes, or more, of storage space.

In addition to potentially requiring several gigabytes of storage space, the internal state of a minimal perfect hash function can be computationally expensive to derive. More specifically, as the quantity of input data increases, thereby resulting in an attendant increase in the number of unique elements in the lookup table that comprises the internal state of a minimal perfect hash function, the computational effort required to generate that internal state exponentially increases. Thus, the generation of a minimal perfect hash function that only needs to hash a small amount of input data is significantly easier than the generation of a minimal perfect hash function that needs to hash a large amount of input data.

Figure 4:
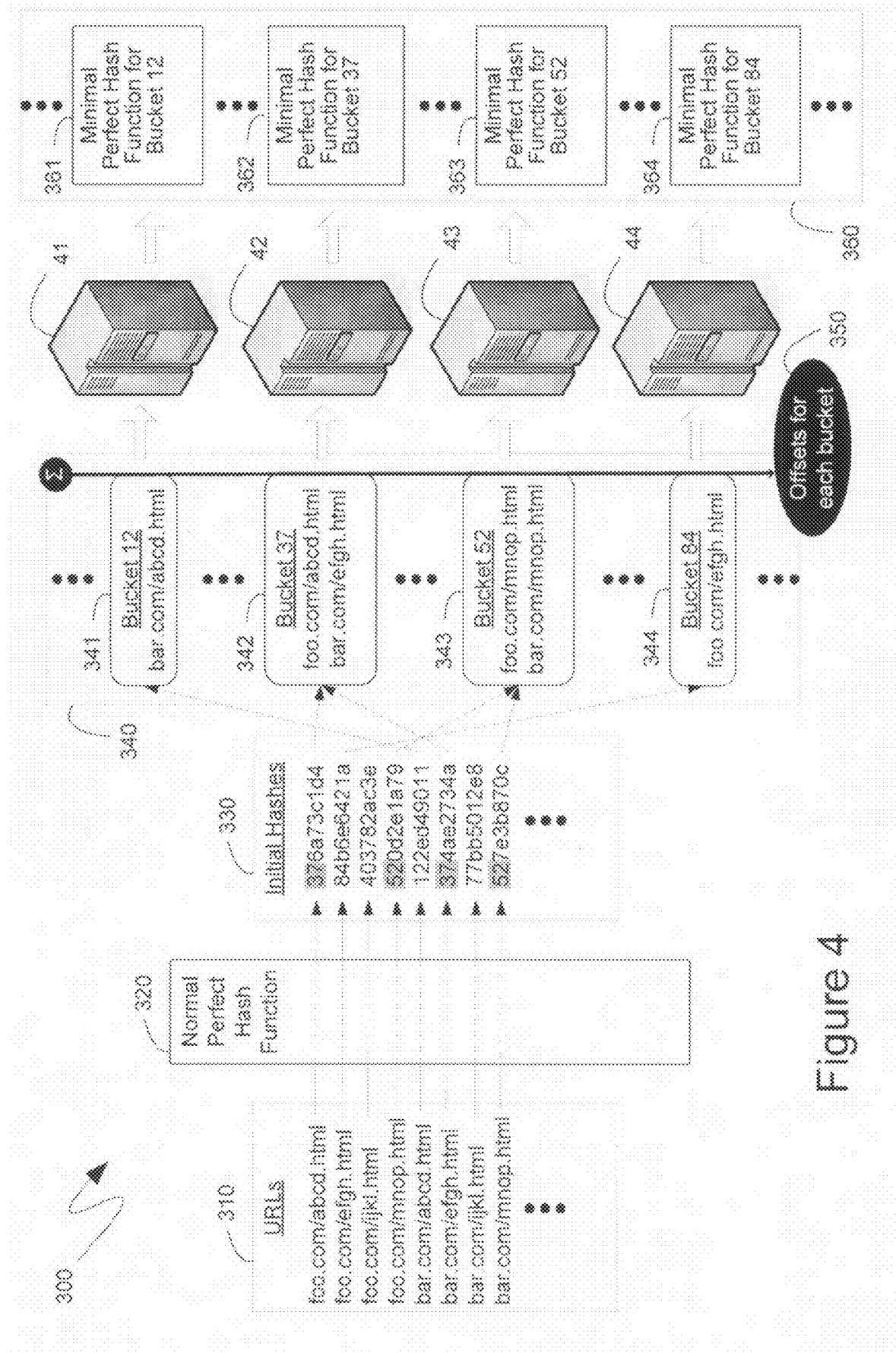
FIG. 4 is a flow diagram illustrating an exemplary process for generating a minimal perfect hash function.

In one embodiment, the fact that minimal perfect hash functions are significantly easier to generate for small amounts of input data is utilized to provide mechanisms for efficient generation of a minimal perfect hash function for large quantities of input data, such as the billions of URLs that would be hashed by a WWW search engine. Turning to FIG. 4, an exemplary flow diagram 300 illustrating one such mechanism is shown. The input data 310 is illustrated as a collection of URLs, though, as indicated previously, any input data would be equally applicable. Initially, the input data is hashed using a normal perfect hash function 320. As will be known by those skilled in the art, the generation of a normal perfect hash function, such as normal perfect hash function 320 can be substantially less computationally expensive than the generation of a minimal perfect hash function.

Initial hashes 330 represent the hash values resulting from the hashing of the URLs 310 by the normal perfect hash function 320. In one embodiment, the leading bits of the initial hashes 330 can be used to divide the associated URLs 310 into groups, colloquially referred to in FIG. 4 as "buckets." The number of leading bits used can be varied to enable the division of the URLs 310 into a variable number of buckets. For example, FIG. 4 illustrates the use of the first eight bits to divide the URLs 310 into buckets 340, since the values of the initial hashes 330 illustrated in FIG. 4 are in hexadecimal, where each hexadecimal digit represents four bits. As will be known by those skilled in the art, there are 256 possible combinations of eight bits. Consequently, the use of the first eight bits of the initial hashes 330 can enable the division of the URLs 310 into up to 256 discrete buckets 340. In an alternative embodiment, the trailing, rather than leading, bits of the initial hashes 330 can be used to divide the URLs 310 into buckets 340.

In a further alternative embodiment, the initial hashes 330 can serve to perform an initial division of the URLs 310 into buckets 340. A subsequent division can ensure that no bucket receives more than a predetermined number of URLs. For example, as will be described, there can exist advantages to ensuring that no bucket comprises more than 256 URLs. Consequently, the subsequent division can ensure that the URLs 310 are ultimately bucketed in such a manner that no bucket comprises more than 256 URLs. In a still further alternative embodiment, the normal perfect hash function 320 can perform a hash in such a manner that the selection of a predetermined number of leading bits from the resulting hash values automatically provides of the division of URLs 310 into buckets not exceeding some predetermined threshold number of URLs.

The number of buckets 340, and, consequently, the number of bits of the initial hash 330 used to divide the URLs into buckets, can be selected such that the buckets need not exceed a predetermined threshold number of URLs in order to accommodate all of the URLs 310. Thus, in one embodiment, the selection of the predetermined threshold number of URLs can be based on storage space requirements, while the selection of the number of buckets can simply follow from the total number of input URLs 310 and the predetermined threshold for each bucket. For example, the selection of a predetermined threshold anywhere between 129 and 256 URLs enables the unique specification of each URL with eight bits. A predetermined threshold of 256 URLs per bucket, therefore, provides for the largest sized buckets for which the bucket's content can be referenced with only eight bits. Thus, a predetermined threshold of 256 URLs can be based on such key storage criteria. If the system of FIG. 4 accepts several billion input URLs 310, and each bucket 340 is to be limited to no more than 256 URLs, then approximately 16 million buckets can be used. The URLs 310 can be divided into those 16 million buckets 340 with reference to 24 bits of each initial hash 330 in the manner described above.

Once the URLs 310 have been divided into buckets 340 based on the hash values 330 derived using a normal perfect hash function 320, they can be provided to multiple computing devices or processes to be processed in parallel, thereby achieving significant efficiencies. For example, as illustrated in FIG. 4, buckets 341, 342, 343 and 344, representing random buckets from the collection of buckets 340, can comprise URLs whose hash values comprised, for example, leading bits corresponding to the buckets 341, 342, 343 and 344 into which the URLs were divided. The buckets 341, 342, 343 and 344 can be provided to computing devices 41, 42, 43 and 44, of the search engine 40, which can then generate minimum perfect hash functions 361, 362, 363 and 364 corresponding to the buckets 341, 342, 343 and 344. Because the number of buckets 340 can exceed the number of individual computing devices 41, 42, 43 and 44, each computing device can be provided an approximately equal number of buckets. Alternatively, the buckets can be divided among the computing devices 41, 42, 43 and 44 based on the relative processing capabilities of such computing devices. And while FIG. 4 illustrates computing devices 41, 42, 43 and 44 as physical computing devices, they can equally represent virtual computing devices, or other independent processes which can perform operations in parallel.

As indicated previously, the derivation of a minimal perfect hash function for given input data can be computationally expensive, and the computational cost can increase exponentially based on the quantity of input data. Thus, by dividing the URLs 310 into multiple buckets 340 comprising a limited number of URLs, each bucket can have a minimal perfect hash function 360 derived for it in a small fraction of the time that it would have taken to derive a minimal perfect hash function for the entire set of URLs 310. Furthermore, because the generation of each minimal perfect hash function, such as minimal perfect hash functions 361, 362, 363 and 364 can be performed independently, the parallelization of the generation of the minimal perfect hash functions 360 further decreases, by another order of magnitude, the time required as compared to the generation of a single minimal perfect hash function for all of the URLs 310.

Once the minimal perfect hash functions 360 for the buckets 340 are derived, they can be stored in the search engine database 50. Additionally, each minimal perfect hash function, such as the minimal perfect hash functions 361, 362, 363 and 364 can be associated with its corresponding bucket, such as buckets 341, 342, 343 and 344, via a bucket identifier. In one embodiment, the bucket identifier can be the same value as the bits of the initial hash 330 referenced to divide the URLs into the buckets 340.

Because each of the minimal perfect hash functions 360 is applicable to a limited quantity of URLs, the internal state of the minimal perfect hash functions 360, even in aggregate, can be much smaller than the internal state of a minimal perfect hash function for all of the URLs 310. For example, as indicated previously, the internal state of a minimal perfect hash function for billions of URLs can require 20 to 30 gigabytes of storage space, or even more. Conversely, if each of the buckets 340 comprises, for example, less than 256 URLs, then each URL can be uniquely identified by a eight bits, or a single byte, in the lookup table that comprises the internal state of the minimal perfect hash functions 360. With 256 entries of one byte each, the internal state of the minimal perfect hash functions 360 can be as small as 256 bytes per function. As indicated previously, if each of the buckets 340 comprises less than 256 URLs, then approximately 16 million buckets can be used to accommodate several billion URLs 310. The aggregate storage requirements for 16 million minimal perfect hash functions corresponding to the 16 million buckets, with each minimal perfect hash function comprising an internal state of 256 bytes, can be as small as 4 gigabytes. As compared to the 20 to 30 gigabytes required for the internal state of a minimal perfect hash function applied to all of the billions of URLs 310, the mechanisms illustrated in FIG. 4 not only provide substantial computational speed advantages, but they also reduce the storage requirements for the internal state of the minimal perfect hash function by at least an order of magnitude.

As will be recognized by those skilled in the art, the output of each of the minimal perfect hash functions 360 is between 0 and one less than the number of elements in the associated bucket. Consequently, if there are millions of minimal perfect hash functions 360, based on millions of buckets of URLs 340, millions of distinct URLs can all be hashed to the same hash value. In one embodiment, to differentiate between them, an offset can be used. Specifically, because of the properties of minimal perfect hash functions, the resulting hash values can be contiguous, beginning with a hash value of zero. Thus, if an initial bucket comprised 100 elements, the minimal perfect hash values of those hundred elements can be between zero to 99. If a subsequent bucket similarly comprised 100 elements, the minimal perfect hash values of those hundred elements could likewise be between zero and 99. To generate discrete minimal perfect hash values across both buckets, the subsequent bucket could include an offset equivalent to the number of elements in the initial bucket. Thus, the minimal perfect hash values of the hundred elements of the initial bucket can be between zero and 99 and the minimal perfect hash values of the hundred elements of the subsequent bucket can be offset by 100 and can, therefore, be between 100 and 199. In such a manner the 200 elements across both the initial and subsequent buckets can all have unique hash values.

The above mechanisms can be equally applied across any number of buckets 340. Thus, as shown in FIG. 4, a summation function can be applied to the number of elements in each bucket of the buckets 340, thereby obtaining offset values 350 corresponding to each bucket. More specifically, the offset value for any bucket of the buckets 340 can be the sum of the number of elements in each of the preceding buckets. In one embodiment, the offsets 350 can be determined prior to the derivation of the minimal perfect hash functions 360, while in an alternative embodiment, such offsets can be derived afterwards based on, for example, the number of elements in the lookup tables of each of the individual minimal perfect hash functions 340. The offsets corresponding to each bucket, and thus to each associated minimal perfect hash function as well, can be stored in the search engine database 50 along with the associated minimal perfect hash function and corresponding bucket identifier.

Figure 5:
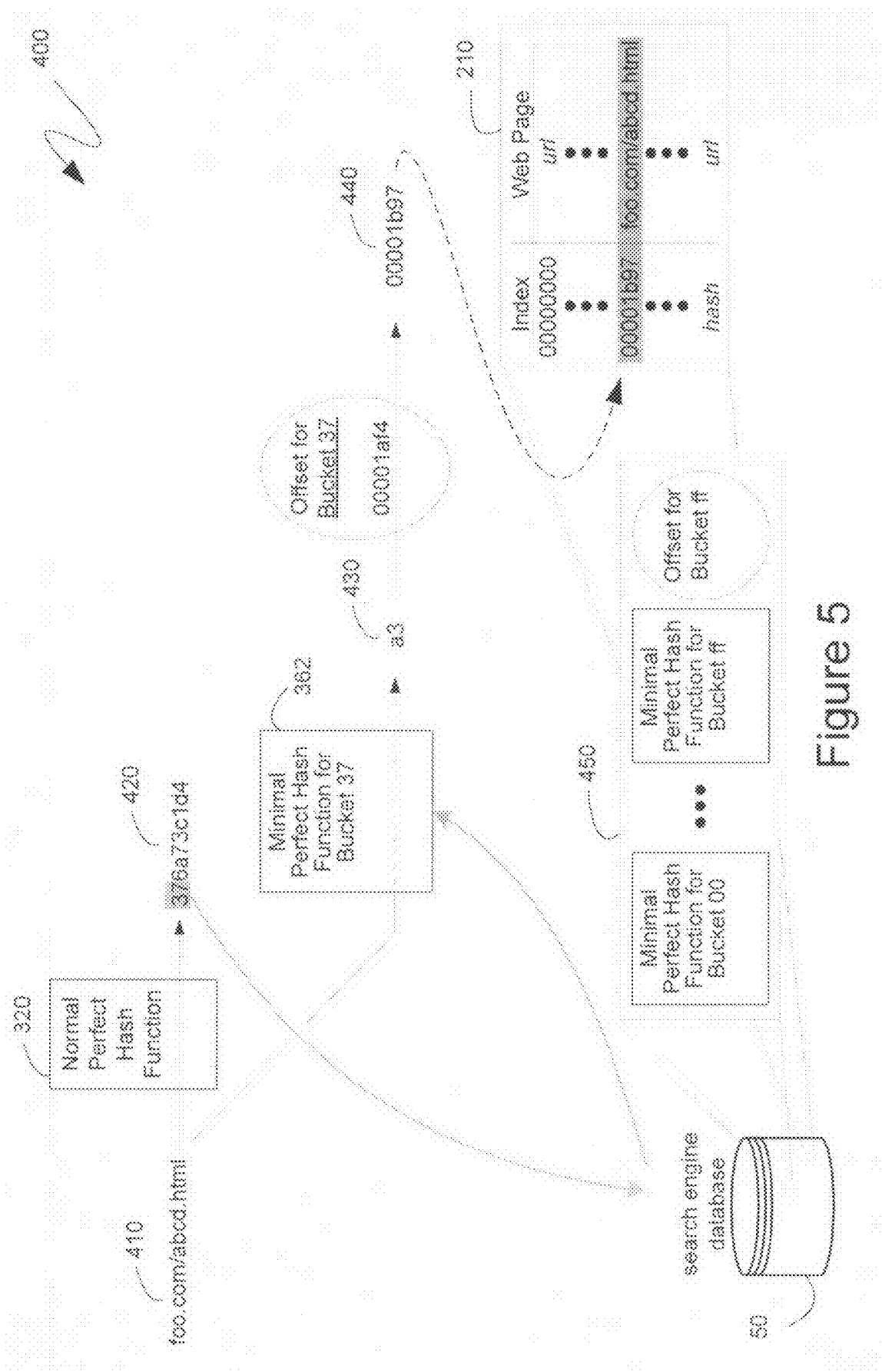
FIG. 5 is a flow diagram illustrating an exemplary hashing process.

Turning to FIG. 5, a flow diagram 400 is shown, illustrating one mechanism for using the multiple minimal perfect hash functions 360 to obtain a hash value for a URL 410 from among the URLs 310. As described previously, the search engine database 50 is illustrated in FIG. 5 as comprising collection 450 comprising minimal perfect hashes for each bucket and an associated offset. In one embodiment, the minimal perfect hash for the initial bucket need not have an offset associated with it, since its offset is zero.

Initially, as shown in FIG. 5, a URL 410, from among the URLs 310, can be obtained for hashing using the minimal perfect hash function derived by the mechanisms described above and exemplified by the flow diagram 300 of FIG. 4. The URL 410 can be hashed using the same normal perfect hash function 320 described above to obtain a hash value 420. Bits of the hash value 420 can then be used, as described in detail above, to identify a bucket into which the URL 410 would have been placed by the mechanisms described above. That bucket identifier can be used to obtain, from the search engine database 50, and specifically from the collection 450, an appropriate minimal perfect hash function 362 and offset 460, as shown.

Once obtained, the minimal perfect hash function 362 can be used to hash the URL 410 to obtain a hash value 430. Subsequently, the obtained hash value 430 can be offset by the offset 460 to obtain a final hash value 440 representing a unique identifier for the URL 410 among all of the URLs 310. In one embodiment, the final hash value 440, comprising a mere four or five bytes can be used by the search engine 40 in the databases, such as databases 51, 52 or 53, that comprise the search engine database 50, instead of the URL 410 itself, which can be 100 bytes or more. In another embodiment, the final hash value 440 can be associated with the URL 410, such as through a table 210 or similar data storage structure. As shown in FIG. 5, the table 210 can also be stored as part of the search engine database 50.

Figure 6:
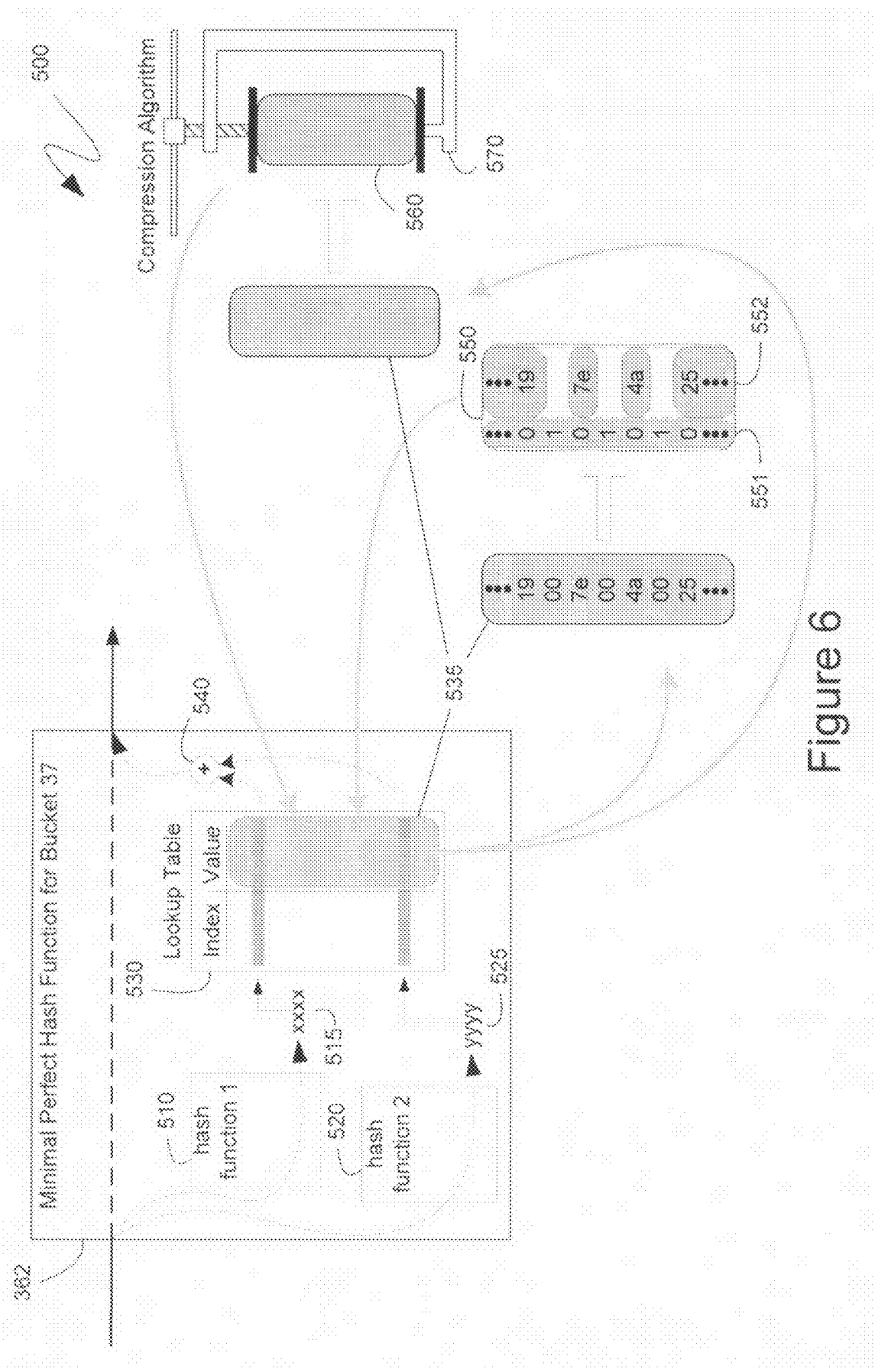
FIG. 6 is a flow diagram illustrating an exemplary process for reducing the storage space required by a minimal perfect hash function.

Although the above described mechanisms can reduce the storage requirements of the internal state of a minimal perfect hash function by dividing the minimal perfect hash function into multiple "sub-functions," further storage efficiency can be achieved through compression mechanisms applied to the internal state of each of the divided minimal perfect hash functions 360. FIG. 6 illustrates a flow diagram 500 showing two such compression mechanisms that can be individually or aggregately applied. To illustrate the application of these compression mechanisms, the minimal perfect hash function 362 from FIGS. 4 and 5 is illustrated so as to show processing internal to that hash function. Specifically, in one embodiment, a minimal perfect hash function, such as the minimal perfect hash function 362, can initially pass the input data through two different hash functions 510 and 520, resulting in hash values 515 and 525, respectively, as shown in FIG. 6. The hash values 515 and 525 can act as pointers into a lookup table 530 that can represent the internal state of the minimal hash function 362. Such a lookup table 530 can comprise a series of values 535, with a unique value for each data input to the minimal perfect hash function 362. In fact, very often, the lookup table 530 can comprise a series of values 535 that is at least 1.15 times greater than the number of data input to the minimal perfect hash function 362. Once the values, from among the series of values 535, that are identified by the pointers 515 and 525, are obtained, they can be summed by a summation function 540, and the resulting value can be provided as the hash value output from the minimal perfect hash function 362.

In one embodiment, the series of values 535 that comprises the lookup table 530 can include a disproportionate number of entries whose values are zero. As indicated previously, even for minimal perfect hash functions that only need to hash 256 unique elements, or less, each entry in the series 535 can be represented by eight bits. However, because of the disproportionate number of entries whose values are zero, each of those zero value entries can instead be indicated by a single bit in a bit vector 551. Specifically, a bit vector 551 can comprise a single bit entry corresponding to each entry from the series 535. If an entry in the series 535 has a value of zero, the bit vector can indicate a "1" or "positive" indication. If an entry in the series 535 has a non-zero value, the bit vector can indicate a "0" or "negative" indication.

Once the bit vector 551 is created, all of the zero valued entries from the series 535 can be removed, resulting in series 552 having "holes" comprising no bits at all where previously eight bits, for example, were used to represent a zero. The combination 550 of the bit vector 551 and the series 552 can then be used in place of series 535. Specifically, the bit vector 551 can be referenced first. If its value is one, then an eight bit zero value can be generated. If its value is zero, then the series 552 can be consulted for the appropriate value. In essence, therefore, all of the zero valued entries from the series 535, which could have required eight bits, or more, to represent, can now be represented by a single bit. While the remaining values can now comprise nine bits; namely the initial eight and the one bit of the bit vector 551, the combination 550 can still be more space efficient than the series 535 due to the quantity of zeros in most practical versions of the series 535.

In addition to comprising a disproportionate number of zero valued entries, the series 535 can also comprise a disproportionate number of entries whose values are fairly small. Such a skewed distribution of values enables the effective use of compression algorithms 670 to generate a compressed version 660 of the series 535. The compressed version 660 can be stored in the search engine database 50 instead of the series 535, and the compressed version 660 can be expanded into the series 535 when the minimal perfect hash function 362 is required.

In one embodiment, the compression algorithm 670 used to compress the series 535 into the compressed version 660 can be the well known Huffman encoding algorithm. As will be known by those skilled in the art, the Huffman encoding algorithm can sort the values of the series 535 and can assign common values identifiers that comprise fewer numbers of bits. Thus, while every value in the series 535 is represented by an equal number of bits, a Huffman encoded version can represented the most common values with a fewer number of bits. Thus, for distributions of values that are not uniform, Huffman encoding can provide a mechanism with which to further reduce the storage space required for such values.

Figure 7:
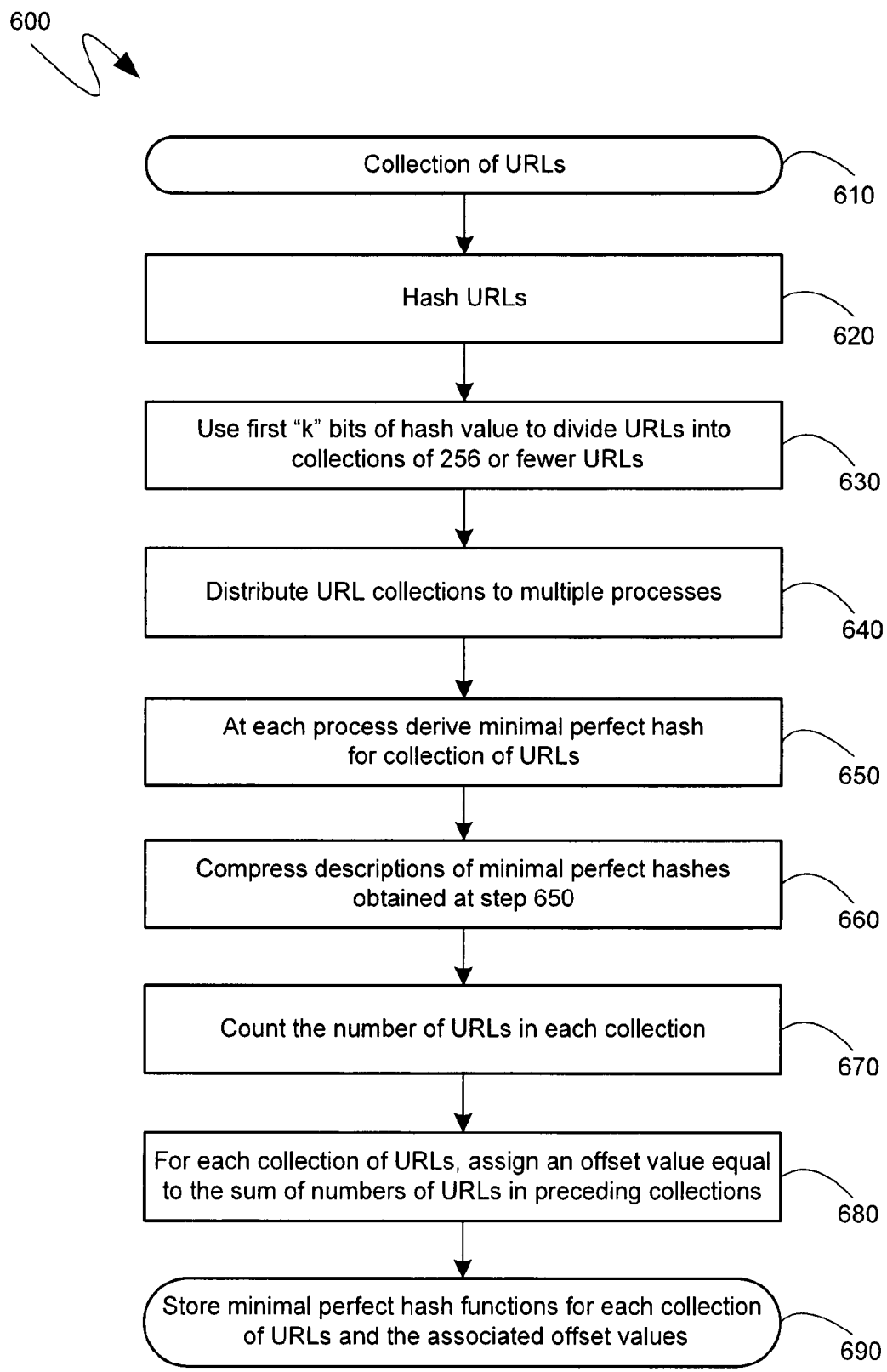
FIG. 7 is a flowchart illustrating an exemplary process for generating a minimal perfect hash function and FIG. 8 is a flowchart illustrating an exemplary hashing process.
Figure 8:
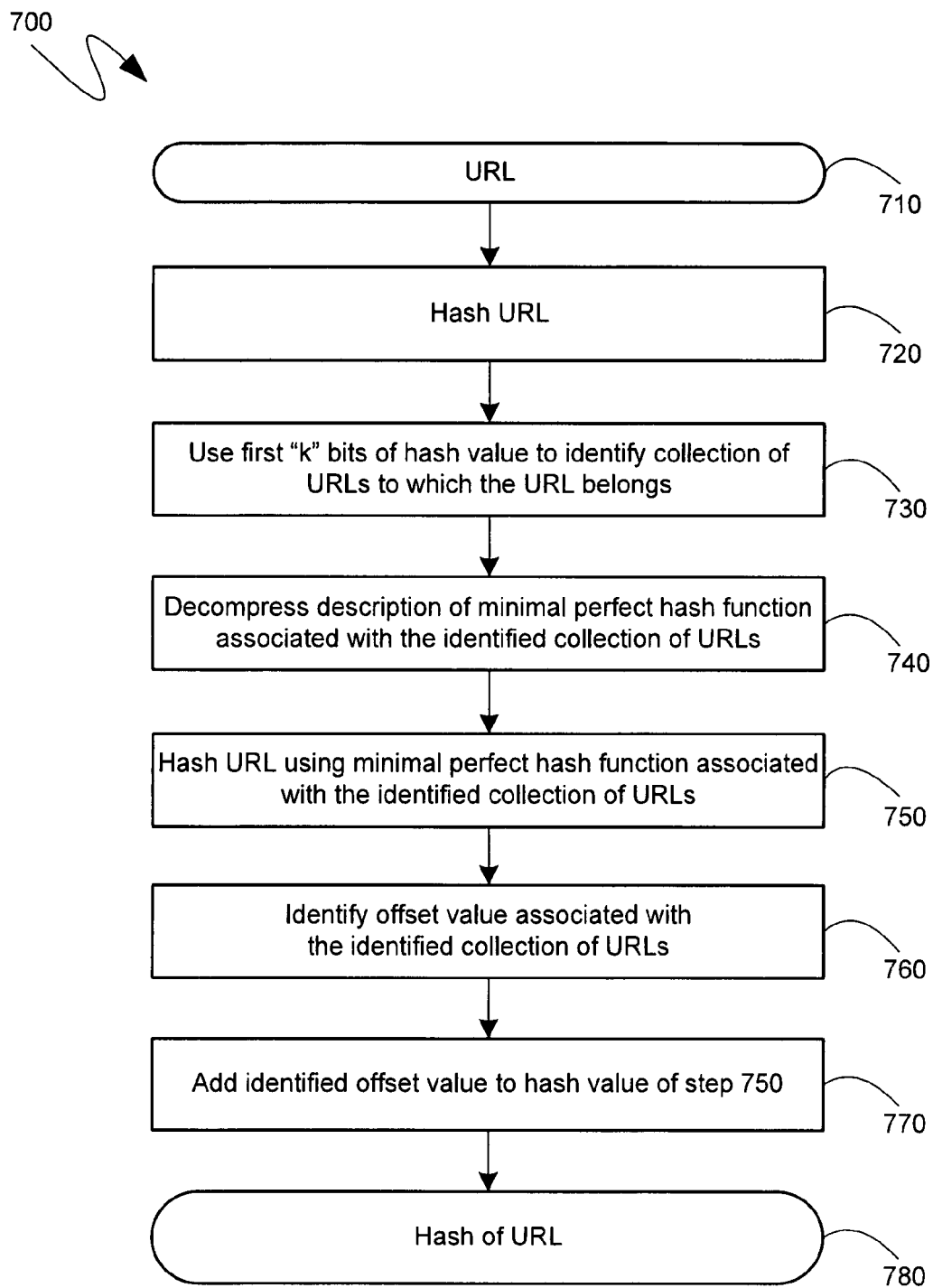

FIGS. 7 and 8 illustrate the overall application of the above described mechanisms exemplarily illustrated by FIGS. 4, 5 and 6. Specifically, FIG. 7 illustrates a flowchart 600 showing the construction of a minimal perfect hashing algorithm that can be used to hash a large quantity of input data while consuming a minimum amount of storage space. As shown, a collection of URLs can be obtained at step 610 as an initiating step. Subsequently, the URLs can be hashed at step 620 using, for example a normal perfect hash function. The resulting hash values can be used at step 630 to divide the URLs into collections, or "buckets," not exceeding a predetermined number of URLs. Once the URLs are divided into buckets, they can be provided to multiple processes or computing devices at step 640. The multiple processes or computing devices can, at step 650, in parallel, derive a minimal perfect hashing algorithm for the collection of URLs in the bucket provided to that process or computing device.

Using the above described mechanisms, the resulting minimal perfect hash functions can be compressed at step 660. In one embodiment, the number of URLs in each bucket can be counted at step 670, though, in an alternative embodiment, such a counting can be performed at an alternative time, such as prior to step 640. Once the number of URLs in each bucket has been counted, an offset value equal to the sum of the numbers of URLs in preceding buckets can be assigned to each bucket at step 680. Finally, at step 690, the resulting minimal perfect hash functions and associated offset values can be stored.

Turning to FIG. 8, a flowchart 700 illustrates the usage of the minimal perfect hash function derived by the steps of the flowchart 600, shown in FIG. 7. Specifically, at an initial step 710, a URL to be hashed can be obtained. The URL can be initially hashed at step 720 using, for example, the same hashing function as was used in step 620, described above. The resulting hash value can be used at step 730 to identify a particular bucket to which the URL would have been assigned by step 630, also described above. The minimal perfect hashing function associated with the bucket identified at step 730 can first have its internal state decompressed at step 740. Subsequently, at step 750, the URL of step 710 can be hashed by the minimal perfect hash function associated with the bucket identified at step 730.

An offset value associated with the bucket identified at step 730 can be identified at step 760 and the resulting hash value of step 750 can then be offset; at step 770, by the offset value identified at step 760. Once the offset is applied at step 770 the resulting value, at step 780, is the hash of the URL of step 710.

As can be seen from the above descriptions, input data can be hashed using a minimal perfect hash function comprised of multiple subsidiary minimal perfect hash functions, thereby enabling the overall minimal perfect hash function to be derived in a significantly shorter amount of time and consume a significantly smaller amount of storage space. In view of the many possible variations of the subject matter described herein, we claim as our invention all such embodiments as may come within the scope of the following claims and equivalents thereto.

We claim:

1. One or more computer-readable storage media comprising computer-executable instructions for performing a method for generating a minimal perfect hash function, the instructions executed via a processor on a computer comprising a memory whereon the instructions are stored, the computer-executable instructions performing method comprising:
dividing input data into at least two collections of input data;
deriving individual minimal perfect hash functions associated with each of the at least two collections of input data; and
obtaining individual offset values for association with one or more hash functions, the offset values associated with each of the at least two collections of input data, wherein an individual offset value associated with a collection of input data is based on a sum of input data of collections of input data preceding the collection of input data;
wherein the deriving the individual minimal perfect hash functions comprises assigning the derivation of the individual minimal perfect hash functions to multiple processes to be performed in parallel.

2. The computer-readable media of claim 1, wherein the dividing the input data comprises hashing the input data to obtain initial hash values and dividing the input data into the at least two collections based on at least some bits of the initial hash values.

3. The computer-readable media of claim 1, wherein the dividing the input data comprises providing for each of the at least two collections to comprise no more than a threshold number of input data.

4. The computer-readable media of claim 1, wherein the dividing the input data comprises dividing the input data into a sufficient number of collections of input data to enable each collection of input data to comprise no more than a threshold number of input data.

5. The computer-readable media of claim 1, wherein the dividing the input data comprises dividing the input data into a greater number of collections of input data than available processes for processing the collections of input data.

6. The computer-readable media of claim 1, wherein the assigning the derivation of the individual minimal perfect hash functions to the multiple processes comprises assigning the derivation of the individual minimal perfect hash functions based on a processing capability of processors associated with the multiple processes.

7. The computer-readable media of claim 1, wherein the deriving the individual minimal perfect hash functions comprises compressing an internal state of at least one of the individual minimal perfect hash functions.

8. The computer-readable media of claim 7, wherein the compressing the internal state of the at least one of the individual minimal perfect hash functions comprises generating a bit vector indicating the presence of zero values in a lookup table associated with the internal state of the at least one of the individual minimal perfect hash functions; and removing the zero values from the lookup table.

9. The computer-readable media of claim 7, wherein the compressing the internal state of the at least one of the individual minimal perfect hash functions comprises Huffman encoding the internal state of the at least one of the individual minimal perfect hash functions.

10. The computer-readable media of claim 1, comprising performing a hash of a first collection of input data of the at least two collections of input data using the identified individual minimal perfect hash function associated with the first collection to obtain a minimal perfect hash value, wherein the performing the hash of the first collection of input data comprises performing a first hash of the first collection of input data using a first hash function to obtain a first hash value; performing a second hash of the first collection of input data using a second hash function to obtain a second hash value; referencing a first value in an internal state of the identified individual minimal perfect hash function based the first hash value; referencing a second value in the internal state of the identified individual minimal perfect hash function based on the second hash value; and adding the first value and the second value together.

11. One or more computer-readable storage media comprising computer-executable instructions for performing a method for hashing input data, the instructions executed via a processor on a computer comprising a memory whereon the instructions are stored, the method comprising:
identifying an individual minimal perfect hash function associated with the input data;
identifying an individual offset value associated with the input data;

performing a hash of the input data using the identified individual minimal perfect hash function to obtain a minimal perfect hash value, wherein the performing the hash of the input data comprises performing a first hash of the input data using a first hash function to obtain a first hash value; performing a second hash of the input data using a second hash function to obtain a second hash value; referencing a first value in an internal state of the identified individual minimal perfect hash function based the first hash value; referencing a second value in the internal state of the identified individual minimal perfect hash function based on the second hash value; and adding the first value and the second value together; and applying the identified individual offset value to the minimal perfect hash value.

12. The computer-readable media of claim 11, wherein the identified individual offset value is equivalent to a number of data in collections preceding a collection comprising the input data.

13. The computer-readable media of claim 11 comprising further computer-executable instructions for performing an initial hash of the input data to obtain an initial hash value, wherein the identifying the individual minimal perfect hash function is performed with reference to the initial hash value, and wherein further the identifying the individual offset value is performed with reference to the initial hash value.

14. The computer-readable media of claim 11, wherein the performing the hash of the input data comprises decompressing an internal state of the identified individual minimal perfect hash function.

15. The computer-readable media of claim 14, wherein the decompressing the internal state comprises referencing a bit vector to determine if a value in a lookup table is zero.

16. The computer-readable media of claim 14, the decompressing the internal state comprises applying a Huffman decoding to the internal state as stored.

17. One or more computer-readable storage media comprising computer-executable instructions for performing a method for compressing an internal state of a minimal perfect hash function, the instructions executed via a processor on a computer comprising a memory whereon the instructions are stored, method comprising:

applying a Huffman encoding to the internal state of the minimal perfect hash function if the internal state comprises a value 8 whose frequency of occurrence is skewed; and generating a bit vector representing zero values of the internal state of the minimal perfect hash function and removing the zero values from the internal state if the internal state comprises a disproportionately large number of zero values;

wherein the minimal perfect hash function is associated with an offset value for joining the minimal perfect hash function to other minimal perfect hash functions to enable minimal perfect hashing of input data.

18. The computer-readable media of claim 17, wherein the minimal perfect hash function is based on a collection of data divided from input data based on hash values of the input data.

* * * * *